US006947497B1

(12) United States Patent
Ahn

(10) Patent No.: US 6,947,497 B1
(45) Date of Patent: Sep. 20, 2005

(54) DIGITAL SIGNAL RECEIVER AND METHOD FOR RECEIVING DIGITAL SIGNAL

(75) Inventor: Won-ick Ahn, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 983 days.

(21) Appl. No.: 09/614,698

(22) Filed: Jul. 12, 2000

(30) Foreign Application Priority Data

Jul. 12, 1999 (KR) .................................. 99-27988

(51) Int. Cl.[7] .............................................. H04L 27/22
(52) U.S. Cl. ....................... 375/326; 375/229; 375/316
(58) Field of Search ............................... 375/326, 229, 375/230, 231, 232, 236, 346, 316, 233, 285, 375/327, 350, 371, 376

(56) References Cited

U.S. PATENT DOCUMENTS 5,712,873 A * 1/1998 Shiue et al. ................ 375/233
6,678,317 B1 * 1/2004 Murakami et al. .......... 375/232

FOREIGN PATENT DOCUMENTS

| | | |
|---|---|---|
| EP | 0 524 559 A2 | 1/1993 |
| JP | 7-95136 | 4/1995 |
| JP | 8-172464 | 7/1996 |
| JP | 8-237520 | 9/1996 |
| JP | 10-75385 | 3/1998 |
| KR | 97-31619 | 6/1997 |

OTHER PUBLICATIONS

IEEE Transactions On Signal Processing, Jun. 1992, vol. 40, No. 6, pp. 1383-1398.
IEE Journal On Selected Areas In Communications, Jan. 1993, vol. 11, No. 1, pp. 119-126.

* cited by examiner

*Primary Examiner*—Jean B. Corrielus
*Assistant Examiner*—Guillermo Munoz
(74) *Attorney, Agent, or Firm*—Sughrue Mion, PLLC

(57) ABSTRACT

A digital signal receiver and a method for receiving a digital signal. The receiver includes an equalizing unit for compensating for an amplitude distortion of a received signal, an original signal decision unit for deciding an original signal from a signal which is compensated for the amplitude distortion, a carrier recovering and phase lock detecting unit for detecting a phase error between an input of the original signal decision unit and the decided original signal, and outputting a phase lock signal, a re-rotating unit for restoring the signal from the original signal decision unit to its original state and outputting a restored signal to the equalizer, and a coefficients updating unit for receiving the phase lock signal from the carrier recovering and phase lock detecting unit and the restored signal from the re-rotator unit, generating an error for updating the coefficients of the equalizer, and updating the coefficients of the equalizer.

9 Claims, 3 Drawing Sheets

TO DECODER
a (n)
22
ORIGNAL SIGNAL DECISION UNIT
y (n)
24
CARRIER RECOVERY UNIT AND PHASE LOCK DETECTOR
RE-ROTATOR
26
z (n)
LOCK SIGNAL
20
EQUALIZER
EQUALIZER COEFFICIENTS UPDATE UNIT
28
x (n)
FROM DEMODULATOR

ORIGINAL SIGNAL DECESION UNIT
22
a (n)
PHASE ERROR DETECTOR
242
PHASE LOCK DETECTOR
247
LOOP FILTER
244
VCO
y (n)
248
246
"1"
COUNTER
249
24
CONJUGATE COMPLEX NUMBER GENERATOR
262
26 RE-ROTATOR
LOCK SIGNAL
264
208
z (n)
FEED BACK EQUALIZER
204
206
FEED FORWARD EQUALIZER
202
x (n)
20
SECOND COEFFICIENTS UPDATER
286
FIRST COEFFICIENTS UPDATER
284
ERROR GENERATOR
282
28
EQUALIZER COEFFICIENTS UPDATE UNIT

DIGITAL SIGNAL RECEIVER AND METHOD FOR RECEIVING DIGITAL SIGNAL

BACKGROUND OF THE INVENTION

1. Field of the Invention

The present invention relates to a digital signal receiver, and more particularly, to a digital signal receiver to which a self-recovering equalization algorithm is applied for an initial predetermined time and a decision directed algorithm is applied after the predetermined time has lapsed and a method for receiving a digital signal.

2. Description of the Related Art

Figure 1:
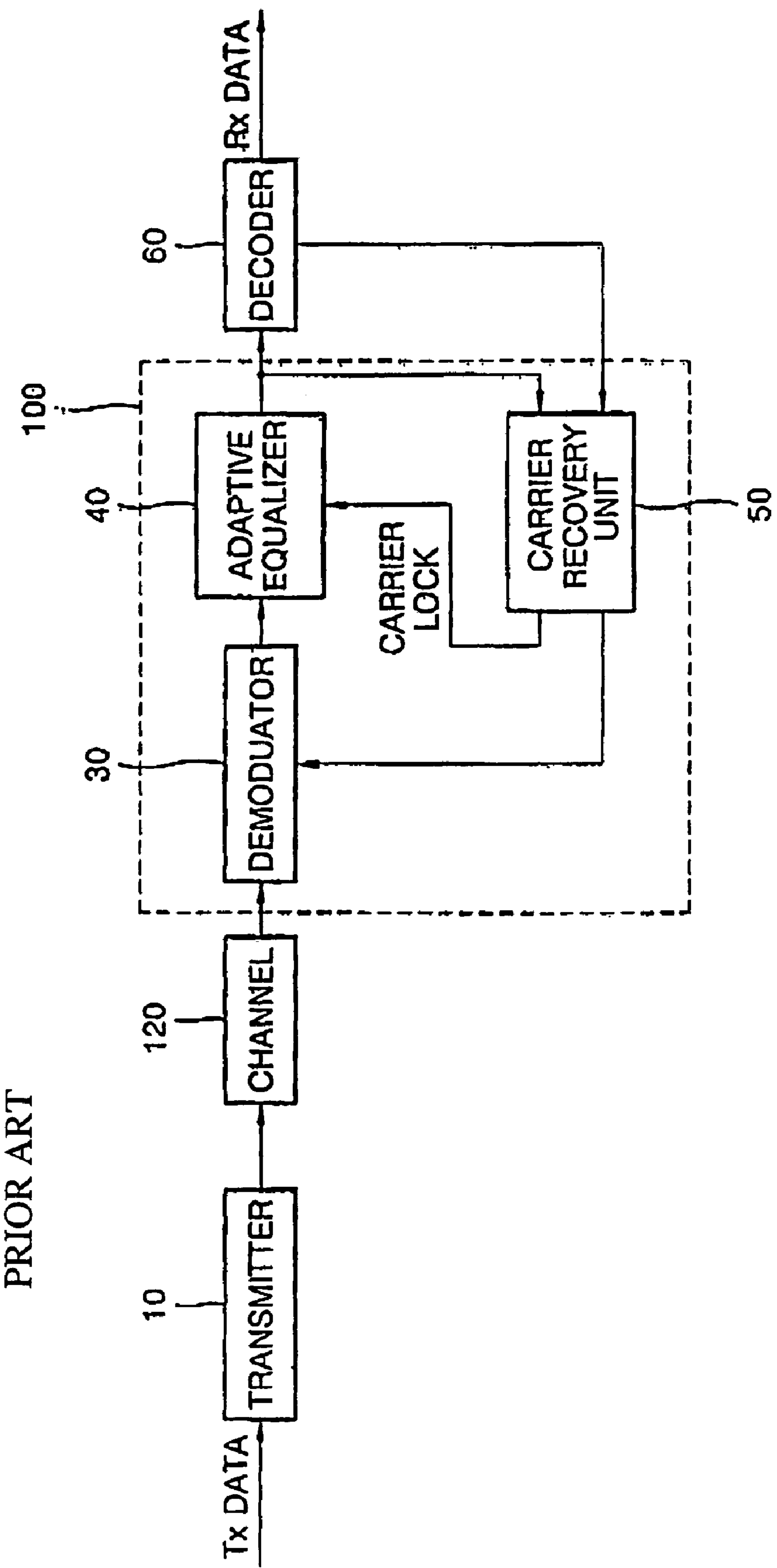

FIG. 1 shows the structure of a conventional digital signal receiver, which is a part of European Patent Application No. 92112305.5 (Publication No. 524559) entitled "Carrier Phase Recovery for an Adaptive Equalizer".

The digital signal receiver shown in FIG. 1 includes a transmitter 10, a channel 120, a carrier recovery loop circuit 100, and a decoder 60. The carrier recovery loop circuit 100 includes a demodulator 30, an adaptive equalizer 40, and a carrier recovery unit 50.

A received signal at the transmitter 10 is input to the demodulator 30 through the channel 120. The adaptive equalizer 40 receives the signal demodulated by the demodulator 30 and compensates for the distortion of the signal generated by the channel 120. The output signal from the adaptive equalizer 40 is input to the carrier recovery unit 50, thus generating a control signal according to frequency offset and controlling the demodulation frequency of the demodulator 30.

The carrier recovery unit 50 is required to compensate for the frequency offset generated by the inconsistency of oscillators used for a digital signal transmitter and a digital signal receiver. A phase lock detector in the carrier recovery unit 50 detects the frequency offset of the carrier recovery unit 50 and converts the algorithm of the adaptive equalizer 40 from a first algorithm to a second algorithm, thus reducing remaining errors.

However, in a conventional technology, since the adaptive equalizer 40 which is a delay line exists in the carrier recovery loop circuit 100, it is difficult to quickly capture and trace the frequency offset due to the delay of a signal. Since the carrier recovery unit 50 must operate from an initial equalization step, the signal which is not completely equalized is input to the carrier recovery unit 50, thus delaying the time for capturing the frequency offset.

SUMMARY OF THE INVENTION

To solve the above problem, it is an object of the present invention to provide a digital signal receiver by which it is possible to quickly recover a desired signal by equalizing a received signal by applying a self-recovering equalization algorithm for an initial stage and then applying a decision directed equalization algorithm after the received signal is equalized to some degree.

It is another object of the present invention to provide a method for receiving the digital signal.

Accordingly, to achieve the first object, there is provided a digital signal receiver, comprising an equalizing unit which operates by a self-recovering equalization algorithm in an initial stage and by a decision directed equalization algorithm after a predetermined time has lapsed, for compensating for an amplitude distortion of a received signal, an original signal decision unit for deciding an original signal from a signal which is compensated for the amplitude distortion, a carrier recovering and phase lock detecting unit which operates after the predetermined time has lapsed, for detecting a phase error between an input of the original signal decision unit and the decided original signal, and outputting a phase lock signal when the phase is captured by the phase error, a re-rotating unit for restoring the signal from the original signal decision unit to its original state by the phase compensated by the carrier recovering and phase lock detecting unit and outputting a restored signal to the equalizer, and a coefficients updating unit for receiving the phase lock signal from the carrier recovering and phase lock detecting unit and the restored signal from the re-rotator unit, generating an error for updating the coefficients of the equalizer, and updating the coefficients of the equalizer.

The equalizing unit preferably comprises a feedforward equalizer, a feedback equalizer, an adder for adding the output from the feedforward equalizer to the output from the feedback equalizer, and an equalization algorithm converter for selecting the output of the adder so as to be equalized by the self-recovering equalization algorithm in the initial stage, selecting the output from the re-rotator so as to be equalized by the decision directed algorithm when the phase lock signal is output from the carrier recovering and phase lock detecting unit, and outputting the selected output to the feedback equalizer.

The carrier recovering and phase lock detecting unit preferably comprises a phase error detector for detecting a phase error between the input signal of the original signal decision unit and the decided original signal, a phase lock detector for outputting the phase lock signal (Lock) when the phase is locked at the phase error detector and a frequency offset is within a predetermined range, a phase locked loop for locking the phase when the phase is not locked at the phase error detector, a selector for selecting "1" or an output from the phase locked loop, a multiplier for multiplying the signal from the equalizer to the signal from the selector, and a counter for controlling the selector so that "1" or the output from the phase locked loop is selected according to the signal from the phase lock detector.

The re-rotating unit preferably comprises a conjugate complex number generator and a multiplier for multiplying a complex output number from the conjugate complex number generator by the output from the original signal decision unit.

The coefficients updating unit preferably comprises an error generator for receiving the outputs from the equalizing unit and the re-rotating unit and generating an error for updating the equalizer according to the signal from the equalizer in an initial stage and generating an error for updating the equalizer according to the signal from the re-rotating unit when the phase lock signal is received from the phase lock detector, a first coefficients updater for updating the coefficients of the feedforward equalizer according to the error from the error generator, and a second coefficients updater for updating the coefficients of the feedback equalizer.

The phase locked loop preferably increases loop bandwidth so as to quickly capture the frequency offset when the carrier recovering unit operates in the initial stage.

The counter preferably controls the selector by counting the number of symbols of the received signal.

To achieve the second object, there is provided a method for receiving a digital signal, comprising the steps of (a) determining whether the output from the phase lock detector is a frequency offset release signal or a frequency offset capture signal, (b) compensating for the distortion of the received signal by not operating the carrier recovering unit and operating the equalizer by the self-recovering equalization algorithm when it is determined that the frequency offset release signal is output in the step (a), and (c) compensating for the distortion of the received signal by operating the carrier recovering unit and operating the equalizer by the decision directed algorithm when it is determined that the frequency offset capture signal is output in the step (a).

BRIEF DESCRIPTION OF THE DRAWING(S)

Figure 2:
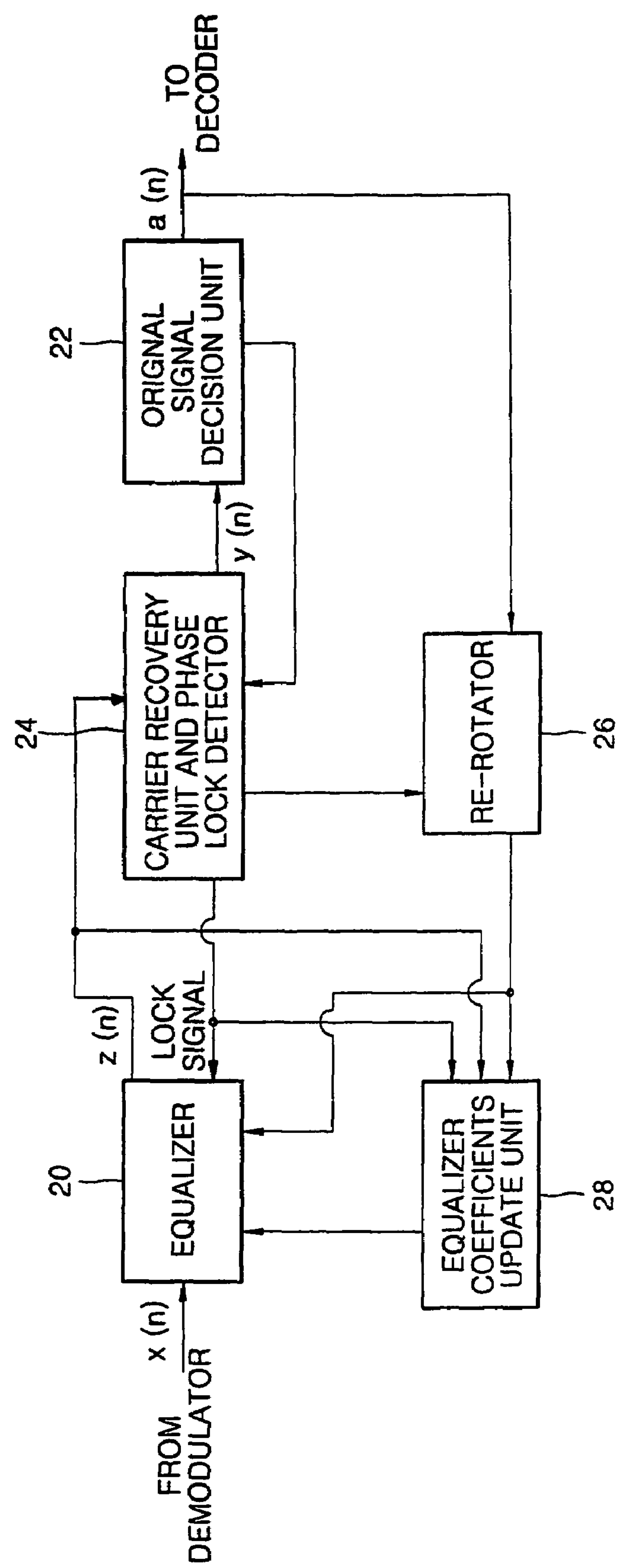
Figure 3:
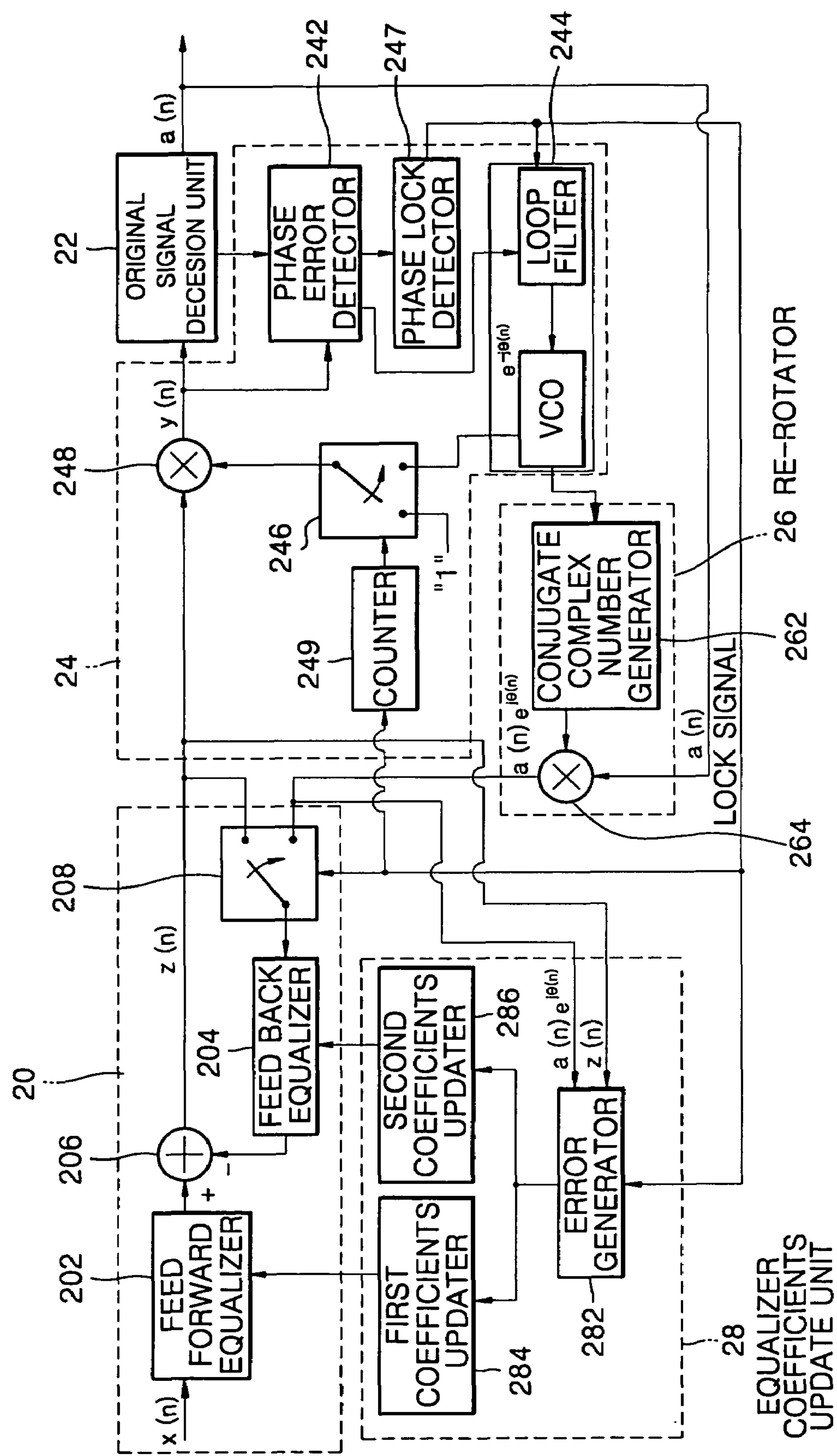

The above objects and advantages of the present invention will become more apparent by describing in detail a preferred embodiment thereof with reference to the attached drawings in which:

FIG. 1 shows the structure of a conventional digital signal receiver;

FIG. 2 schematically shows a digital signal receiver according to the present invention; and FIG. 3 shows the structure of FIG. 2 in detail.

DESCRIPTION OF THE PREFERRED EMBODIMENTS

FIG. 2 schematically shows a digital signal receiver according to the present invention.

The digital signal receiver shown in FIG. 2 includes an equalizer 20, an original signal decision unit 22, and a carrier recovery unit and phase lock detector 24, a re-rotator 26, and an equalizer coefficients update unit 28.

The equalizer 20 operates by a self-recovering equalization algorithm which is not affected by phase at an initial stage and by a decision directed equalization algorithm after being operated by the self-recovering equalization algorithm for a predetermined time, thus compensating for an amplitude distortion by the channel of a received signal x(n) from a demodulator (not shown).

The original signal decision unit 22 decides an original signal from a signal z(n) from the equalizer 20 in an initial equalization step and from a signal y(n) from the carrier recovery unit and phase lock detector 24 after the initial equalization step. For example, when it is assumed that the level of a signal input to the original signal decision unit 22 is 1.3, the level of the original signal can be decided to be 1.

The carrier recovery unit and phase lock detector 24 operates after a predetermined time has passed from the initial equalization step, detects a phase error between the signal (obtained by compensating for predetermined frequency offset) input to the original signal decision unit 22 and the signal decided by the original signal decision unit 22, detects phase lock from the detected phase error, outputs a phase lock signal (a frequency offset capture signal) when the phase is locked (it is determined whether the phase is locked by judging whether the frequency offset is within a predetermined range), and locks the phase when the phase is not locked.

The re-rotator 26 restores the signal from the original signal decision unit 22 to an original state by the phase compensated for by the carrier recovery unit and phase lock detector 24 and outputs the restored signal to the equalizer 20. Namely, the re-rotator 26 outputs a sine wave whose phase is not corrected to the equalizer 20.

The equalizer coefficients update unit 28 receives the signal z(n) from the equalizer 20, the phase lock signal (Lock) from the carrier recovery unit and phase lock detector 24 and a sine wave from the re-rotator 26, generates an error for updating the coefficients of the equalizer 20, and updates the coefficients of the equalizer 20 by the error.

FIG. 3 shows the structure of FIG. 2 in detail.

The equalizer 20 includes a feedforward equalizer 202, a feedback equalizer 204, an adder 206, and an equalization algorithm converter 208.

The feedforward equalizer 202 equalizes a received signal and outputs the received signal to the adder 206. The feedback equalizer 204 inputs the output from the equalization algorithm converter 208 and outputs it to the adder 206. The adder 206 adds the output from the feedforward equalizer 202 to the output from the feedback equalizer 204 and outputs the equalized signal to the carrier recovery unit and phase lock detector 24 and the equalization algorithm converter 208. The equalization algorithm converter 208 selects the output z(n) from the adder 206 so as to be equalized by the self-recovering equalization algorithm in the initial equalization step and the output from the re-rotator 26 so as to be equalized by the decision directed algorithm after the output is equalized for a predetermined time by the self-recovering equalization algorithm, according to the phase lock signal from a phase lock detector 247 and outputs the selected output to the feedback equalizer 204. The signal output from the adder 206 to the equalization algorithm converter 208 is limited to a fixed constant and below. The fixed constant is decided according to a maximum power of constellation of the signal.

The carrier recovery unit of the carrier recovery unit and phase lock detector 24 includes a phase error detector 242, a phase locked loop 244, a selector 246, a multiplier 248, and a counter 249. The phase lock detector corresponds to the phase lock detector 247.

The phase error detector 242 detects a phase error between a signal input to the original signal decision unit 22 and a signal output from the original signal decision unit 22.

The phase lock detector 247 outputs the phase lock signal (Lock) when the phases of the input and the output are locked at the phase error detector 242 and the frequency offset is within a predetermined range.

The phase locked loop 244 locks the phase when the phase of the phase error from the phase error detector 242 is not locked. Here, the phase locked loop 244 increases the loop bandwidth so as to quickly capture the frequency offset when the carrier recovery unit of the carrier recovery unit and phase lock detector 24 operates in an initial stage.

The selector 246, being controlled by the counter 249, selects "1" or a signal from the phase locked loop 244. The multiplier 248 multiplies the signal z(n) from the equalizer 20 with a signal from the selector 246. Namely, when "1" is selected by the selector 246, the signal z(n) from the equalizer 20 is multiplied by "1" by the multiplier 248. As a result, the signal z(n) from the equalizer 20 is output to the original signal decision unit 22.

The counter 249 controls the selector 246 so that either "1" or the output from the phase locked loop 244 is selected according to the phase lock signal from the phase lock detector 247. Namely, the counter controls the selector 246 to select "1" until a predetermined time lapses when the phase lock signal is not locked (called a frequency offset release where the frequency offset is not within a predetermined range) and to select the output from the phase locked loop 244 when the phase lock signal is locked (called a frequency offset capture where the frequency offset is within a predetermined range). Here, the counter 249 counts the number of symbols of the received signal and controls the selector 246.

The re-rotator 26 includes a conjugate complex number generator 262 and a multiplier 264.

The conjugate complex number generator 262 outputs a complex conjugate number $e^{j\theta(n)}$ of a complex number $e^{j\theta(n)}$ from a voltage controlled oscillator (VCO). The multiplier 264 multiplies the complex conjugate number $e^{j\theta(n)}$ from the conjugate complex number generator 262 with a signal a(n) from the original signal decision unit 22 and outputs a signal whose phase is not corrected to the equalization algorithm converter 208.

The equalizer coefficients update unit 28 includes an error generator 282, a first coefficients updater 284, and a second coefficients updater 286.

The error generator 282 receives the signal z(n) from the equalizer 20 and the signal $a(n)e^{j\theta(n)}$ from the re-rotator 26, generates an error for updating the equalizer according to a signal z(n) from the equalizer 20 in an initial stage and generates an error for updating the equalizer according to a signal from the re-rotator 26 when the phase lock signal is input from the phase lock detector 247. The first coefficients updater 284 updates the coefficients of the feedforward equalizer 202 according to the error from the error generator 282. The second coefficients updater 286 updates the coefficients of the feedback equalizer 204.

The operation of the present invention will be described with reference to FIG. 3.

In the initial equalization step, the carrier recovery unit and phase lock detector 24 does not operate and is in a stand-by state and only the equalizer 20 operates, thus removing interference between symbols of the received signal to some extent.

In the present invention, a decision feedback equalizer which has an excellent remaining error performance and operates stably under poor channel circumstances is used as the equalizer 20. The operation of the equalizer 20 is modified so that the self-recovering equalization algorithm which can converge the equalizer without the help of a training sequence can be used. Namely, the input of the feedback equalizer 204 must be the output from the original signal decision unit 22. However, since the output from the original signal decision unit 22 is not correct due to the rotation of the points of a constellation caused by the influence of the frequency offset, the output from the adder 206 is used as the input of the feedback equalizer 204 instead of the output from the original signal decision unit 22, in the initial equalization step. By doing so, it is possible to prevent an error transmission due to an erroneous input. A constant modules algorithm which is not affected by the phase is used as the self-recovering equalization algorithm.

When the equalizer 20 is converged to some extent in the initial equalization step, the carrier recovery unit and phase lock detector 24 operates. It is difficult for the carrier recovery unit to capture the frequency offset when there is interference between the symbols. However, when the carrier recovery unit captures the frequency offset, a loop bandwidth of the carrier recovery unit, the equalization algorithm of the equalizer 20, and a coefficients update rate is operated so that a smaller remaining error can be obtained. The decision directed algorithm is used as the converted equalization algorithm. The phase lock detector 247 continuously compares the signal in which the frequency offset is recovered with the output from the original signal decision unit 22, detects an error and averages the error by a predetermined number, and generates a capture signal when the average value is no more than a threshold value and a release signal when the average value is no less than the threshold value.

The equalization algorithm, the coefficients update rate, and the loop bandwidth are converted by the capture or release signal. The converted equalization algorithm is the decision directed algorithm and the loop bandwidth is converted into a smaller value. In the decision feedback equalizer, the input of the feedback equalizer 204 is converted into the output from the original signal decision unit 22, thus reducing the remaining error. When the release signal is generated, the equalization algorithm is converted into the self-recovering equalization algorithm and the coefficients update rate is converted into a smaller value. At this time, the carrier recovery unit of the carrier recovery unit and phase lock detector 24 does not operate and is in a stand-by state. When a predetermined time has lapsed and the eye pattern of the received signal is opened again, the loop bandwidth is converted into an initial large value and the carrier recovery unit tries to capture the frequency offset again. When the frequency offset is captured, the phase lock detector 247 generates the capture signal and converts the equalization algorithm into the decision directed algorithm. Accordingly, the digital signal receiver is in a stable state again.

As mentioned above, according to the present invention, it is possible to realize an equalizer which has excellent remaining error performance and operates stably under poor channel conditions without the help of a training sequence by modifying the structure of the decision feedback equalizer such that the self-recovering equalization algorithm can be applied.

Also, it is possible to perform the self-recovering equalization and to quickly capture the frequency offset in the initial equalization state and to obtain the small remaining error in a stable state by automatically converting the equalization algorithm, the coefficients update rate, and the loop bandwidth by the phase lock detector.

What is claimed is:

1. A digital signal receiver, comprising:

an equalizing unit which operates by a self-recovering equalization algorithm in an initial stage and by a decision directed equalization algorithm after a predetermined time has lapsed, for compensating for an amplitude distortion of a received signal;

an original signal decision unit for deciding an original signal from a signal which is compensated for the amplitude distortion;

a carrier recovering and phase lock detecting unit which operates after the predetermined time has lapsed, for detecting a phase error between an input of the original signal decision unit and the decided original signal, and outputting a phase lock signal when the phase is captured by the phase error;

a re-rotator unit for restoring the signal from the original signal decision unit to its original state by the phase compensated by the carrier recovering and phase lock detecting unit and outputting a restored signal to the equalizing unit; and a coefficients updating unit for receiving the phase lock signal from the carrier recovering and phase lock detecting unit and the restored signal from the re-rotator unit, generating an error for updating coefficients of the equalizing unit, and updating the coefficients of the equalizing unit.

2. The digital signal receiver of claim 1, wherein the equalizing unit comprises:

a feedforward equalizer;

a feedback equalizer;

an adder for adding the output from the feedforward equalizer to the output from the feedback equalizer; and an equalization algorithm converter for selecting the output of the adder so as to be equalized by the self-recovering equalization algorithm in the initial stage, selecting the output from the re-rotator so as to be equalized by the decision directed algorithm when the phase lock signal is output from the carrier recovering and phase lock detecting unit, and outputting the selected output to the feedback equalizer.

3. The digital receiver of claim 2, wherein the output of the adder is limited to a fixed constant and below.

4. The digital signal receiver of claim 1, wherein the carrier recovering and phase lock detecting unit comprises:

a phase error detector for detecting a phase error between the input signal of the original signal decision unit and the decided original signal;

a phase lock detector for outputting the phase lock signal (Lock) when the phase is locked at the phase error detector and a frequency offset is within a predetermined range;

a phase locked loop for locking the phase when the phase of the phase error from the phase error detector is not locked;

a selector for selecting “1” or an output from the phase locked loop;

a multiplier for multiplying the signal from the equalizing unit to the signal from the selector; and a counter for controlling the selector so that “1” or the output from the phase locked loop is selected according to the signal from the phase lock detector.

5. The digital signal receiver of claim 1, wherein the re-rotator unit comprises:

a conjugate complex number generator; and a multiplier for multiplying a complex output number from the conjugate complex number generator by the output from the original signal decision unit.

6. The digital signal receiver of claim 2, wherein the coefficients updating unit comprises:

an error generator for receiving the outputs from the equalizing unit and the re-rotator unit and generating an error for updating the equalizing unit according to the signal from the equalizer in an initial stage and generating an error for updating the equalizing unit according to the signal from the re-rotator unit when the phase lock signal is received from the phase lock detector;

a first coefficients updater for updating the coefficients of the feedforward equalizer according to the error from the error generator; and a second coefficients updater for updating the coefficients of the feedback equalizer.

7. The digital signal receiver of claim 4, wherein the phase locked loop increases loop bandwidth so as to quickly capture the frequency offset when the carrier recovering unit operates in the initial stage.

8. The digital signal receiver of claim 4, wherein the counter controls the selector by counting the number of symbols of the received signal.

9. A method for receiving a digital signal using a digital signal receiver including an equalizer for compensating for an amplitude distortion of a received signal, a carrier recovering unit for compensating for frequency offset of the received signal, and a phase lock detector for comparing a signal in which the frequency offset is recovered with an output of an original signal decision unit, detecting an error value, and generating a frequency offset capture signal when the error value is no more than a predetermined threshold value and a frequency offset release signal when the error value is no less than the predetermined threshold value, comprising the steps of:

(a) determining whether the output from the phase lock detector is a frequency offset release signal or a frequency offset capture signal;

(b) compensating for the distortion of the received signal by not operating the carrier recovering unit and operating the equalizer by a self-recovering equalization algorithm when it is determined that the frequency offset release signal is output in the step (a); and (c) compensating for the distortion of the received signal by operating the carrier recovering unit and operating the equalizer by a decision directed algorithm when it is determined that the frequency offset capture signal is output in the step (a).

* * * * *